Jan. 4, 1938. P. E. DOUGHERTY 2,104,718
EDUCATIONAL APPARATUS
Filed Nov. 28, 1936
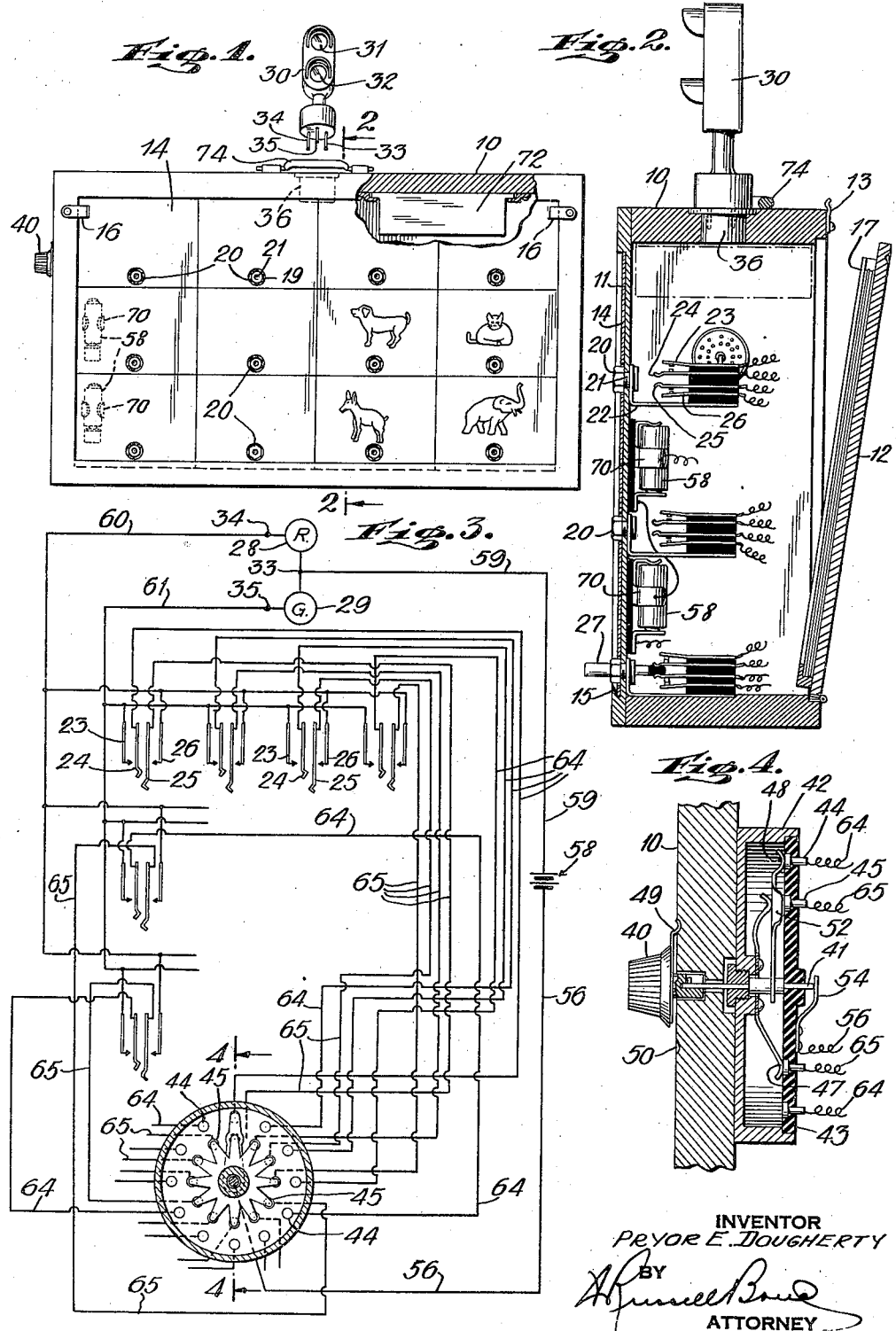
INVENTOR
PRYOR E. DOUGHERTY
BY
ATTORNEY Patented Jan. 4, 1938

2,104,718

UNITED STATES PATENT OFFICE 2,104,718

EDUCATIONAL APPARATUS

Pryor E. Dougherty, Morristown, N. J.

Application November 28, 1936, Serial No. 113,127

7 Claims. (Cl. 35—9)

The present invention relates to improvements in educational apparatus and has for an object to provide a device adapted to rivet the attention of a pupil by visual means and also by requiring the pupil to perform a physical act in response to a teacher's question.

In general, my invention contemplates the use of a set of pictures, maps, charts or other pictorial representations of a subject of study. The instructor asks a question which is to be answered by pointing to one of said pictures. My invention further incorporates means for flashing a "right" signal when the correct picture is pointed to and a "wrong" signal when any other picture is selected by the pupil.

In a preferred embodiment of my invention an electric signalling device is employed which may be in the form of a miniature traffic signal adapted to flash a red light for an incorrect answer and a green light for the correct answer.

My invention further contemplates the provision of a jack for each picture in which a pupil may insert a plug to energize the traffic signal.

A further object of the invention is to provide means electrically connecting each jack normally with the red signal and means controlled by the teacher for selectively connecting any desired one of the jacks to the green signal so that if the pupil inserts the plug in the selected jack the green signal will be flashed instead of the red signal.

A further object of the invention is to provide a compact, portable, self-contained apparatus in which a large number of lesson cards may be stowed, any one of which cards may be instantly mounted in operative position for instruction purposes.

Other objects and advantages of my invention will appear in the following description of a preferred embodiment and thereafter the novelty and scope of the invention will be pointed out in the claims.

Figure 1 is a view in front elevation of my novel educational device.

Fig. 2 is a view in vertical section taken substantially on the line 2—2 of Fig. 1;

Fig. 3 is a diagram of electrical connections; and

Fig. 4 is a view in vertical section of a selector switch, the section being taken substantially on the line 4—4 of Fig. 3.

My educational device comprises a rectangular casing 10 formed with a fixed front wall 11 and a hinged rear wall 12 which may be swung open to give access to the interior of the casing. A latch 13 is provided to hold the rear wall or door 12 in closed position. The front wall 11 is exteriorly recessed to form a shallow frame for a lesson card 14. The lower margin of the frame is undercut, as indicated at 15, to hold the lower edge of the card, and buttons 16 are pivoted to the frame near the top of the casing to hold the card in place. The card may be readily removed and replaced with another whenever desired. A holder 17 for a set of the cards is secured to the inner face of the door 12.

Each card is provided with a series of pictures or with other educational matter thereon about which the teacher is to ask various questions. In the embodiment illustrated, each card is formed with twelve pictures arranged in three horizontal rows of four pictures each. Near the bottom of each picture there is an aperture 19 in the card to clear the head 20 of a socket member 21. The latter projects through the front wall and at its inner end has a bracket 22 secured thereto. Each bracket supports a jack comprising four contact springs 23, 24, 25 and 26 which are normally insulated from each other. The inner contact springs 24 and 25 extend toward the socket member in such position that they will be spread apart by the insertion of a plug 27 through the socket member, thereby making electrical contact with the outer springs 23 and 26, respectively. The plug itself is made of insulation material.

The purpose of the jacks is to complete a circuit to one or another of a pair of electric lamp bulbs 28 and 29, respectively. These lamp bulbs are contained in a housing 30 mounted on the top wall of the casing 10. The housing is preferably in the form of a traffic signal having a hooded red window 31 for the lamp 28 and a hooded green window 32 for the lamp 29. The traffic signal is removably mounted on the casing 10, being provided with three terminal pins 33, 34 and 35, respectively, adapted to enter socket terminals in a socket member 36 in the top wall of the casing, to establish electrical connections to the lamps, as will be explained hereinafter.

A selector switch preferably mounted on one of the end walls of the casing determines whether the green light or the red light will show when the plug is inserted in one of the socket members. The arrangement is such that the red light will flash upon the insertion of the plug 27 in any socket 21 except that which has been selected by operation of the selector switch to cause the green light to flash. The selector switch may be mounted at any inconspicuous position where its setting will not be apparent to the pupil.

As shown in Fig. 4, the selector switch comprises a control button 40 rotatably mounted on the outside of the casing and having a stem 41 fixed thereto which passes through a switch box 42 mounted on the inside of the casing. The switch box is provided with a fixed plate 43 of insulation material in which are mounted twelve pairs of contact buttons 44 and 45, there being a pair for each of the jacks. The buttons 44 are arranged in an outer circular series and the buttons 45 in a concentric inner circular series. A spider of spring metal is fixed to the inside of the switch box and has fingers 47 which contact with the buttons 45, there being a spring finger for each of the buttons 45. Fixed to the stem 41 is a contact arm 48 adapted to make selective contact with the buttons 44. A pointer 49 fixed to the control button 40 indicates which of the buttons 44 is contacted. This pointer is preferably of spring metal and is formed with a convex end adapted to seat in any one of a series of shallow depressions 50 formed in the end wall of the casing when proper contact is made with a corresponding button 44. These depressions may be numbered from 1 to 12 to indicate which of the picture sockets 21 has been selected for operation of the green light. The switch arm 48 is arranged to sweep under the spider fingers 47 and has a convex cam surface 52 adapted to raise each finger 47 that it encounters so that it may pass thereunder and break the electrical contact between such finger and contact button 45. The stem 41 projects through the wall 43 and bears against a contact spring 54.

As shown in the diagram, Fig. 3, a line 56 electrically connects the contact 54 to one terminal of a battery 58. The other terminal of the battery is connected by a line 59 to the lamp terminal 33 of the traffic signal, when the signal device is mounted in operative position. This terminal 33 is common to both of the lamps 28 and 29. The other terminal 34 of the lamp 28 is connected to a line 60 and the other terminal 35 of lamp 29 is connected to a line 61, when the signal device is mounted in operative position. All of the jack fingers 23 are connected in parallel to the line 61 and hence to the green signal lamp 28, while all of the jack fingers 26 are connected in parallel to line 60 and hence to the red signal lamp 29. A line 64 connects each jack finger 24 to a corresponding button 44 in the switch box and a line 65 connects each finger 25 to a corresponding button 45 in the switch box. To avoid undue complications I have shown in the diagram only one complete row of jacks and a single jack in each of the other rows.

The operation of the device is as follows: The instructor asks a question which may be answered by one of the pictures shown on the card, at the same time the instructor operates the switch button 40 to bring the pointer 49 into the socket 50 corresponding to the number of the picture which provides the proper answer to the question. If, for instance, the question is answered by picture No. 1 the control button 40 is turned to bring the pointer 49 into engagement with the socket 50 marked No. 1. In so doing, the switch arm 48 will swing into contact with the button 44 connected to the jack finger 24 of picture No. 1 and at the same time the spider finger 47 will be lifted out of contact with the button 45 connected to the jack finger 25 of picture No. 1. A pupil replies to the question by inserting the plug 27 in socket 21 of the picture which he believes gives the correct answer to the question. Insertion of the plug in the socket of picture No. 1 will cause the green lamp 29 to flash, but insertion of the plug in any other socket will result in flashing of the red signal.

The circuit to the green light may be traced as follows; from the battery 58, through line 59, pin 33, lamp 29, pin 35 and line 61 to the spring fingers 23 of the jacks. The plug 27 having been inserted in jack No. 1 electrical contact is established between fingers 23 and 24 and between fingers 25 and 26 of said jack. Thus, by way of a line 64, the circuit through the green lamp is completed to the button that is contacted by the switch arm 48, the circuit being completed thence to the battery 58 through the switch arm 48, stem 41, contact 54, and line 56. At the same time the circuit of the red lamp may be traced by way of fingers 26 and 25 of jack No. 1 and through a line 65 to the button 45 corresponding to picture No. 1. But here the circuit is interrupted by action of the cam surface 52 which has lifted the spider finger clear of this particular button. Should the plug be inserted in any jack other than that selected by means of the selector switch it would complete a circuit to the red signal lamp by way of the corresponding button 45, spider 47 and switch arm 52, but no green light would show because the selector switch connects only one button 44 to the battery. Thus it will be clear that the apparatus is normally in condition to show a red light upon the insertion of the plug in any of the jacks, but the circuit to the red lamp is broken and switched to that of the green lamp for any selected jack by swinging the switch arm 48 to a position corresponding to the selected jack, thereby virtually extending the spider to contact with the button 44 rather than the button 45 connected to said jack.

I prefer to make my educational device in such form that it can be readily transported and to this end suitable provision is made within the casing, as indicated at 70, to support the cells of the battery 58. All the wiring is located within the casing. The selector switch may be mounted at any desired location, but for convenience I have shown it as being at one end of the casing. When desired the card 14 may be removed from the frame and inserted in the holder 17. In the upper part of the casing, I provide a drawer 72 in which the traffic signal may be stored when the device is not in use. A pivoted handle 74 is mounted on the upper wall of the casing and provides convenient means for transporting the device.

I have described the element 14 as a card but obviously a flexible sheet or other means might be used. The term "card" in the claims is therefore to be construed as comprising any suitable means for displaying educational matter in operative relation to my signal apparatus.

While I have described a preferred embodiment it will be understood that this is to be taken as illustrative and not limitative of my invention and that I reserve the right to make various changes in form, construction and arrangement of parts without departing from the spirit and scope of my invention as set forth in the following claims.

I claim:

1. An educational apparatus comprising means for supporting a card, said card bearing educational matter in separate sections thereof, a pair of signal devices, manually operable control means adjacent each of said sections, means normally arranged to actuate one of said signals in response to the operation of each control means, and selector means settable at will to cause the operation of the other signal instead of that first mentioned when the selected control means is operated.

2. An educational apparatus comprising a support for a card, said card bearing educational matter in separate sections thereof, two electrically controlled signal devices, a manually operable switch for each of said selectors, electrical connections controlled by each switch for normally operating one of the signals, and a selector switch settable at will to switch the control of any selected one of such switches to the other of said signals.

3. An educational apparatus comprising a support on which a card may be removably mounted, such card bearing educational matter in separate locations thereon, a pair of electric lamps, a manually operable switch for each of said locations on the card, electrical connections controlled by each switch for normally operating one of the lamps in response to the operation of the switch, a selector settable at will to switch the control of any one of the selected switches to the other of said lamps, and manual means remote from said switches for controlling said selector.

4. An educational apparatus comprising a support for removably mounting a card, such card bearing educational matter in separate sections thereof and having an aperture in each section, two electric signal devices, plug sockets in the support in position to register with said apertures respectively, a plug insertable in any of the sockets through the corresponding aperture in the card, a jack associated with each socket and operable by insertion of the plug therein, means comprising electrical connections controlled by each jack for activating the signals, said jacks being normally connected to effect activation of one of the signals when the plug is inserted therein, and a selector settable at will to switch the connections from a selected one of the jacks whereby upon insertion of the plug therein the other signal will be activated.

5. An educational apparatus comprising a support for removably mounting a card, such card bearing educational matter in separate sections thereof and having an aperture in each section, two electric signal devices, plug sockets in the support in position to register with said apertures respectively, a plug insertable in any of the sockets through the corresponding aperture in the card, a jack associated with each socket and operable by insertion of the plug therein, means comprising electrical connections controlled by each jack for activating the signals, said jacks being normally connected to effect activation of one of the signals when the plug is inserted therein, a selector settable at will to switch the connections from a selected one of the jacks whereby upon insertion of the plug therein the other signal will be activated, and manual means remote from said sockets for setting said selector.

6. An educational apparatus comprising a support for removably mounting a card, such card bearing educational matter in separate sections thereof and having an aperture in each section, two electric signal devices, plug sockets in the support in position to register with said apertures respectively, a plug insertable in any of the sockets through the corresponding aperture in the card, a jack associated with each socket and operable by insertion of the plug therein, means comprising electrical connections controlled by each jack for activating the signals, said jacks being normally connected to effect activation of one of the signals when the plug is inserted therein, a selector settable at will to switch the connections from a selected one of the jacks whereby upon insertion of the plug therein the other signal will be activated, manual means for setting said selector, and means remote from said sockets for indicating which of the jacks has been switched to control such other signal.

7. A self-contained portable educational apparatus comprising a casing having a recessed front wall forming a frame for a card, means for detachably holding the card in said frame, means within the casing for supporting a plurality of such cards, each card bearing educational matter in separate locations thereon and having an aperture in each of said locations, signal means comprising a pair of electric lamps and a housing therefor removably mounted on the casing, a receptacle in the casing for said signal means when dismounted, a plug socket in the support in position to register with each of the apertures in the card mounted in the frame, a plug insertable in any of the sockets, a jack within the casing associated with each socket and operable by insertion of the plug therein, a battery mounted in the casing, electrical connections between the battery and the lamps when the signaling means is in mounted position, said electrical connections being controlled by the jacks whereby one of the lamps will normally be energized when any one of the jacks is operated, a selector switch within the casing selectively operable to switch the connections controlled by any one of the jacks whereby upon operation of the selected jack the other lamp will be energized instead, and a manual control for the selector switch mounted on the outside of the casing remote from said sockets.

PRYOR E. DOUGHERTY.